US009918259B2

(12) United States Patent
Klein et al.

(10) Patent No.: US 9,918,259 B2
(45) Date of Patent: Mar. 13, 2018

(54) HANDOVER RELATION IDENTIFICATION UTILIZING NETWORK EVENTS

(71) Applicants: AT&T Mobility II LLC, Atlanta, GA (US); AT&T Intellectual Property I, L.P., Atlanta, GA (US)

(72) Inventors: Robert Steven Klein, Manchester, CT (US); Mark Austin, Roswell, GA (US); Ralph Knag, Morris Plains, NJ (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 4 days.

(21) Appl. No.: 15/244,318

(22) Filed: Aug. 23, 2016

(65) Prior Publication Data

US 2016/0360453 A1 Dec. 8, 2016

Related U.S. Application Data

(63) Continuation of application No. 14/719,957, filed on May 22, 2015, now Pat. No. 9,451,512, which is a continuation of application No. 14/035,751, filed on Sep. 24, 2013, now Pat. No. 9,084,172, which is a continuation of application No. 13/593,228, filed on Aug. 23, 2012, now Pat. No. 8,565,771.

(51) Int. Cl.
| | |
|---|---|
| *H04W 36/00* | (2009.01) |
| *H04W 36/30* | (2009.01) |
| *H04W 16/14* | (2009.01) |
| *H04W 36/14* | (2009.01) |
| *H04W 36/32* | (2009.01) |

(52) U.S. Cl.
CPC ....... *H04W 36/0083* (2013.01); *H04W 16/14* (2013.01); *H04W 36/14* (2013.01); *H04W 36/30* (2013.01); *H04W 36/32* (2013.01)

(58) Field of Classification Search
CPC .................................................. H04W 36/0083
USPC ........................................ 455/432.1, 436–448
See application file for complete search history.

(56) References Cited

U.S. PATENT DOCUMENTS

| 5,796,722 A | 8/1998 | Kotzin et al. |
| 6,314,301 B1 | 11/2001 | Dorenbosch et al. |
| 6,477,143 B1 | 11/2002 | Ginossar |
| (Continued) | | |

OTHER PUBLICATIONS

Office Action dated Apr. 28, 2017 for U.S. Appl. No. 15/014,503, 28 pages.

(Continued)

*Primary Examiner* — Joel Ajayi
(74) *Attorney, Agent, or Firm* — Amin, Turocy & Watson, LLP

(57) ABSTRACT

Aspects relate to automatically establishing neighbor relations for adjacent sectors based on one or more network events. The neighbor relations can be established between sectors that can be identified as inter-frequency neighbors or intra-frequency neighbors. In an aspect, the network events can be active call data events received from one or more mobile devices. The active call data events can be radio access bearer establishments and internal system releases. In another aspect, the network events can be idle call data events received from one or more mobile devices. If a first event ended on a first sector and a second event started on a second sector before expiration of an interval that started when the first event ended, the first sector and second sector can be defined as neighbors.

20 Claims, 12 Drawing Sheets

(56) References Cited

U.S. PATENT DOCUMENTS

| | | |
|---|---|---|
| 6,826,620 B1 | 11/2004 | Mawhinney et al. |
| 7,120,467 B2 | 10/2006 | Umesh et al. |
| 7,813,329 B2 | 10/2010 | Mori et al. |
| 7,941,148 B2 | 5/2011 | Roskowski et al. |
| 8,014,362 B2 | 9/2011 | Panico et al. |
| 8,161,182 B1 | 4/2012 | Cheng et al. |
| 8,406,146 B2 | 3/2013 | Quilty et al. |
| 2003/0218974 A1 | 11/2003 | Zuniga |
| 2006/0128394 A1 | 6/2006 | Turina et al. |
| 2008/0039089 A1 | 2/2008 | Berkman et al. |
| 2008/0039141 A1 | 2/2008 | Claussen et al. |
| 2008/0181291 A1 | 7/2008 | Zhou et al. |
| 2008/0239953 A1 | 10/2008 | Bai et al. |
| 2009/0034453 A1 | 2/2009 | Motegi et al. |
| 2009/0047956 A1 | 2/2009 | Moe et al. |
| 2009/0124262 A1 | 5/2009 | Vela et al. |
| 2009/0129448 A1 | 5/2009 | Koslov et al. |
| 2009/0163223 A1 | 6/2009 | Casey |
| 2009/0186627 A1 | 7/2009 | Zhang |
| 2010/0088410 A1 | 4/2010 | Ridley |
| 2010/0232390 A1 | 9/2010 | Varma et al. |
| 2010/0254354 A1 | 10/2010 | Sutivong et al. |
| 2011/0130144 A1 | 6/2011 | Schein et al. |
| 2011/0176424 A1 | 7/2011 | Yang et al. |
| 2011/0182224 A1 | 7/2011 | Ishii |
| 2011/0228687 A1 | 9/2011 | Catovic et al. |
| 2011/0292821 A1 | 12/2011 | Chin et al. |
| 2012/0044908 A1 | 2/2012 | Spinelli et al. |
| 2012/0236717 A1 | 9/2012 | Saska et al. |
| 2013/0077482 A1 | 3/2013 | Krishna et al. |
| 2013/0130691 A1 | 5/2013 | Zhu et al. |
| 2013/0337814 A1 | 12/2013 | Wong et al. |

OTHER PUBLICATIONS

Notice of Allowance dated Jan. 16, 2014 for U.S. Appl. No. 13/557,960, 21 pages.

Office Action dated Apr. 21, 2014 for U.S. Appl. No. 13/686,868, 25 pages.

Office Action dated Apr. 8, 2014 for U.S. Appl. No. 13/691,495, 21 pages.

Office Action dated Jul. 23, 2014 for U.S. Appl. No. 14/035,751, 22 pages.

Notice of Allowance dated Sep. 12, 2014 for U.S. Appl. No. 14/253,768, 29 pages.

Office Action dated Oct. 14, 2014 for U.S. Appl. No. 13/691,495, 28 pages.

Office Action dated Nov. 21, 2014 for U.S. Appl. No. 14/035,751, 27 pages.

Office Action dated Feb. 25, 2015 for U.S. Appl. No. 13/691,495, 28 pages.

Office Action dated Jul. 7, 2015 for U.S. Appl. No. 14/719,957, 23 pages.

Office Action dated Aug. 13, 2015 for U.S. Appl. No. 13/691,495, 14 pages.

Office Action dated Nov. 25, 2015 for U.S. Appl. No. 14/719,957, 21 pages.

HANDOVER RELATION IDENTIFICATION UTILIZING NETWORK EVENTS

CROSS REFERENCE TO RELATED APPLICATIONS

This application is a continuation of, and claims the benefit of priority to each of, U.S. patent application Ser. No. 14/719,957, filed May 22, 2015, and entitled "HANDOVER RELATION IDENTIFICATION UTILIZING NETWORK EVENTS," which is a continuation of U.S. patent application Ser. No. 14/035,751 (Now U.S. Pat. No. 9,084,172), filed Sep. 24, 2013, and entitled "HANDOVER RELATION IDENTIFICATION UTILIZING NETWORK EVENTS," which is a continuation of U.S. patent application Ser. No. 13/593,228 (Now U.S. Pat. No. 8,565,771), filed Aug. 23, 2012, and entitled "HANDOVER RELATION IDENTIFICATION UTILIZING NETWORK EVENTS." The entireties of these applications are hereby incorporated herein by reference.

TECHNICAL FIELD

The subject disclosure relates to wireless communications and, more particularly, to handover relation identification utilizing network events.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls have been blamed for user dissatisfaction. On the network side, instances of dropped calls can occur during handoff, which is a process of transferring an ongoing call or an ongoing data session between network sectors.

BRIEF DESCRIPTION OF THE DRAWINGS

Various non-limiting embodiments are further described with reference to the accompanying drawings in which.

DETAILED DESCRIPTION

Figure 1:
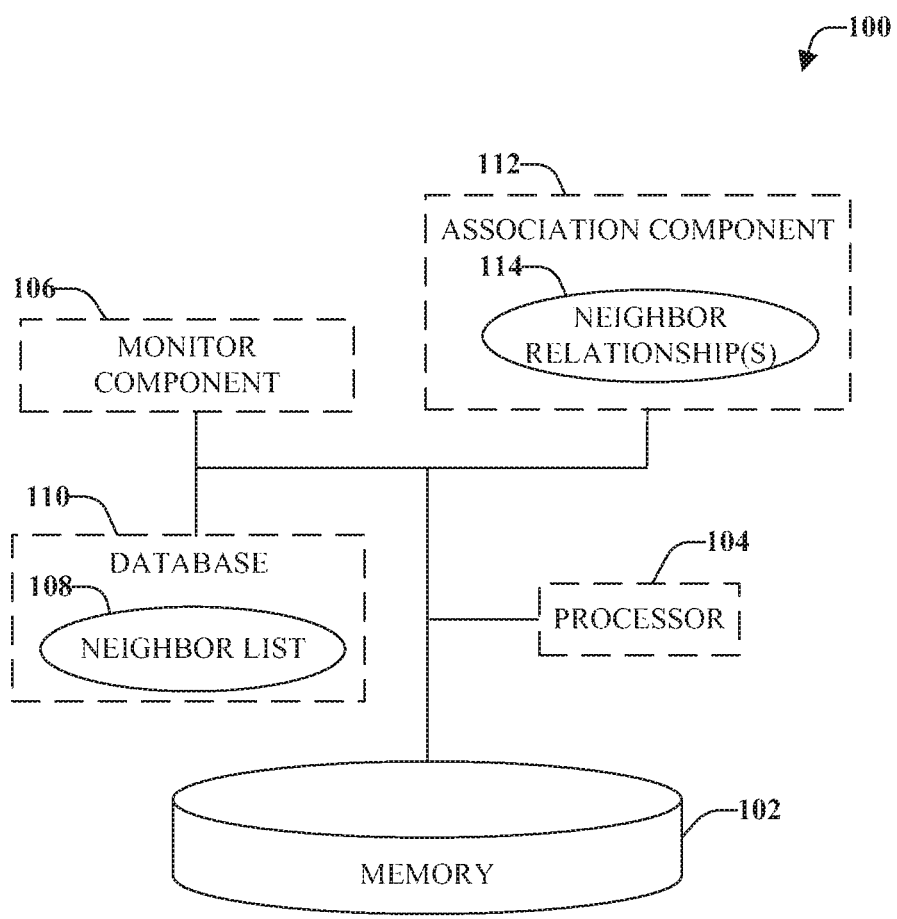
FIG. 1 illustrates an example, non-limiting system that can be configured to identify inter-frequency handover relationships using network events, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various embodiments disclosed herein can be configured to identify inter-frequency neighbor relations and/or intra-frequency neighbor relations by utilizing network reported events in order to ascertain that two sectors overlap in coverage. Since the two sectors overlap in coverage, the two sectors can be eligible to be defined as inter-frequency relations or as intra-frequency relations.

In an implementation, some networks can be self-configuring networks, wherein new base stations that are added to a network can be automatically configured and integrated into the network. The disclosed aspects can be utilized in the self-configuring networks to enable dynamic identification and configuration of neighbor relations (e.g., by populating a neighbor list). In another implementation, some networks can be self-organizing networks, wherein neighbor relations can be dynamically established and/or modified through use of the various aspects disclosed herein.

In an example, General Performance Event Handling (GPEH) data can be utilized to identify which sectors, regardless of ARFCN (e.g., intra-frequency, inter-frequency), interact with each other and warrant definition as neighbors. In an implementation, any cases of a specific mobile device ending a connection of any type on a first sector (e.g., a source sector) and then, within a configurable period (e.g., 20 seconds, 30 seconds, and so forth), initiating a connection of any type on a second sector (e.g., a target sector) are flagged. Based in part on the flagging, it can be established whether the first sector and the second sector are to be defined as neighbors. If not already defined as neighbors, a neighbor relationship can be established. In an aspect, the first sector and the second sector can be of different ARFCN and can be defined as inter-frequency neighbors. In another aspect, the first sector and the second sector can be of the same or a similar ARFCN and can be defined as intra-frequency neighbors.

It is noted that although various aspects and embodiments are discussed herein with respect to Universal Mobile Telecommunications System (UMTS), the subject disclosure is not limited to a UMTS implementation. For example, aspects or features of the disclosed embodiments can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (Wi-MAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In a UMTS application example, the various aspects disclosed herein address one or more shortcomings by mitigating a "blind spot" that network operators might have when various UARFCN frequency layers are deployed. The benefits of the disclosed aspects include gains in downlink (DL) non-HS power efficiency and DL code utilization by reducing the time a mobile device spends in CM (compressed mode). This can be achieved by identifying and handing off to an inter-frequency handover (IFHO) relation faster. Benefits also include resultant voice and data accessibility gains by improved operational efficiency of DL codes and DL power. Another benefit includes reduced uplink (UL) received total wideband power (RTWP) of the neighbor sectors due to less mobile device power ramping while in CM and between non-similar UARFCN sectors due to idle and active mode relation lists being common. A further benefit of the disclosed aspects is a reduction in voice and data dropped calls. Regarding dropped calls, for sectors that rely heavily on IFHOs to move active traffic to adjacent sectors where the same UARFCN is not deployed, the improvement in IFHO performance can be a gain (which might be a significant gain) to overall performance and reliability.

Additionally, the disclosed aspects can improve circuit switched (CS) and packet switched (PS) retainability. Additional benefits can include improved HS and non-HS power efficiency and reduced compressed mode operation.

Another benefit includes increased operational efficiencies as compared to adding IFHO relations using a time intensive and iterative process. For example, during the operation of a wireless network, a mobile device measures and reports the pilot code power (e.g., received signal code power (RSCP)) of neighboring sectors that are using the same frequency. In a UMTS network, for example, while operating in compressed mode, the mobile device also measures the received signal code power (RSCP) of UMTS Terrestrial Radio Access (UTRA) Absolute Radio Frequency Channel Number's (UARFCN's) (non used frequency (NUF)) that are different from the frequency in use. This measurement is utilized in order to trigger the need for an inter-frequency handover (IFHO) when nearing the edge of a UARFCN's deployment area. However, there is no reporting of the inter-frequency information (e.g., RSCP, primary synchronization codes (PSCs), and so forth) to the UTRAN (Universal Terrestrial Radio Access Network) except when the primary scrambling code (PSC) of a sector's NUF becomes eligible as an IFHO target. In this case, the measured NUF must be already defined as an IFHO neighbor relation. Thus, for the case of IFHO, the mobile device can only detect and handover to those neighboring sectors that have already been defined as IFHO relations. If an eligible sector for IFHO that was not defined as an IFHO neighbor relation were to be present, there would be no IFHO attempted towards that sector. Further, no information is available to alert the operator (e.g., wireless network) about the need to add the IFHO neighbor relation to the source sector.

The identification of same-frequency neighbors can be performed by the existence of tools available through the operator (e.g., Original Equipment Manufacturer (OEM) vendor) which, on a per-sector basis, informs the operator of the PSCs that are being measured strongly by the mobile devices but are not currently defined as intra-frequency neighbor relations. This is referred to as a missing neighbor report or a Wireless Networked Control Systems (WNCS) report. However, such identification is time intensive and iterative.

According to the various aspects disclosed herein, increased operational efficiencies can also be realized when launching new carriers since the time needed to optimize IFHO relations can be reduced. In accordance with some aspects, self-healing can be realized in cases where a specific frequency layer of a SHO neighbor goes offline.

In an example embodiment, an aspect relates to a system that can include at least one memory that stores computer-executable instructions and at least one processor communicatively coupled to the at least one memory. The processor facilitates execution of the computer-executable instructions to observe a pair of network events reported by a mobile device. The pair of network events can comprise a first event that occurs on a first sector and a second event that occurs on a second sector. The processor also facilitates execution of the computer-executable instructions to define the first sector and the second sector as adjacent sectors as a result of the pair of network events and include an identification of the second sector based on the definition to a set of first neighbors associated with the first sector, wherein the set of first neighbors comprises at least one neighbor.

According to another example embodiment, an aspect relates to a method that includes monitoring, by a system comprising at least one processor, a set of events associated with a mobile device. The set of events can include a first event and a second event. The method also includes distinguishing, by the system, a first time based on an end of the first event on a first sector from a second time based on a start of the second event on a second sector. Further, the method includes establishing, by the system, a neighbor relationship between the first sector and the second sector when the second event starts within a predefined period after the first event ends. The first sector and the second sector can be inter-frequency neighbors.

In accordance with another example embodiment, an aspect relates to a non-transitory computer-readable storage medium storing computer-executable instructions that, in response to execution, cause a system including a processor to perform operations. The operations can include monitoring network events for active voice call data and idle call data received from a plurality of mobile devices and identifying pairs of network events that occur between two sectors. The operations can also include analyzing temporal aspects of each of the pairs of network events and updating a group of neighbors of one of the two sectors with an identification of the other one of the two sectors as a result of the analyzing.

These and other aspects or embodiments are described in more detail below.

Referring initially to FIG. 1, illustrated is an example, non-limiting system 100 that can be configured to identify inter-frequency handover relationships using network events, according to an aspect. The disclosed aspects provide for an air interface technology to identify overlap in coverage for two or more sectors. As a function of the identified overlap in coverage, it might be beneficial to define the two or more sectors are neighbors. Such identification and neighbor definition (e.g., neighbor list) can be provided even if the various sectors utilize different frequencies (e.g., defined as inter-frequency neighbors). Neighbor lists (both intra-frequency and inter-frequency), which can be robust neighbor lists or optimal neighbor lists, can result in a reduction of drop calls as well as other benefits. For example, a call (e.g., voice call, data session, and so forth) might be dropped due to a degradation of the air interface (Uu). The degradation of the air interface can be mitigated through the use of neighbor lists. Although the various aspects are discussed with respect to inter-frequency neighbor relations, the disclosed aspects are not so limited and can be extended to intra-frequency neighbor relations.

System 100 can be implemented in a network (e.g., base station, access point, sector, and so forth). As previously noted, although the various aspects are discussed herein with reference to UMTS, the aspects are not limited to an UMTS implementation. Instead, the various aspects can be utilized with other network technologies and UMTS technology is utilized herein for purposes of explaining the various aspects.

System 100 can include at least one memory 102 that can store computer executable components and instructions. System 100 can also include at least one processor 104, communicatively coupled to the at least one memory 102. Coupling can include various communications including, but not limited to, direct communications, indirect communications, wired communications, and/or wireless communications. The at least one processor 104 can facilitate execution of the computer executable components stored in the memory 102. It is noted that although one or more computer executable components may be described herein and illustrated as components separate from memory 102 (e.g., operatively connected to memory), in accordance with various embodiments, the one or more computer executable components could be stored in the memory 102. Further, while various components have been illustrated as separate components, it will be appreciated that multiple components can be implemented as a single component, or a single component can be implemented as multiple components, without departing from example embodiments.

System 100 can include a monitor component 106 that can be configured to observe various events related to a single mobile device or related to multiple mobile devices. As utilized herein, a mobile device can include an air interface-based electronic device, such as, but not limited to, a cell phone, a PDA (personal digital assistant), a media player, a digital camera, a media recorder, a laptop, a personal computer, a printer, a scanner, a tablet, a GPS (global positioning system) module, a gaming module, and so forth. Further, the mobile device can also include air interface-based appliances that can be employed, for example, in a home, an office, a building, a retail store, a restaurant, a hotel, a factory, a warehouse, and so on. It is noted that although referred to as a "mobile device", the device can be mobile (e.g., cellular phone) and/or have limited mobility (e.g., desktop computer).

The network events observed by the monitor component 106 can include, but are not limited to, Radio Access Bearer (RAB) establishments, channel switching, and internal system releases (e.g., dropped calls) for both active voice and data calls. According to some implementations, monitor component 106 can be configured to search for different cell identifiers (e.g., sector identifiers) that are provided within a close time proximity (e.g., configurable time period, predefined time period) as reported by mobile devices that are in "idle mode".

In an aspect, monitor component 106 can distinguish between an end of a first event and a start of a second event. For example, monitor component 106 can ascertain when a connection has ended and, further, can detect when a connection is established.

In an implementation, monitor component 106 can be configured to flag situations where a first connection ended on a first sector and, within a configurable interval, a second connection was initiated on a second sector. The flagged situations can be retained for further purposes related to determining whether or not the two sectors (e.g., the first sector on which the connection ended and the second sector on which the second connection was initiated) are to be defined as neighbors. For example, the retained pattern of flagged sections can be utilized to establish a pattern, to develop a confidence level of whether the sectors are to be defined as neighbors, and so forth.

Figure 2:
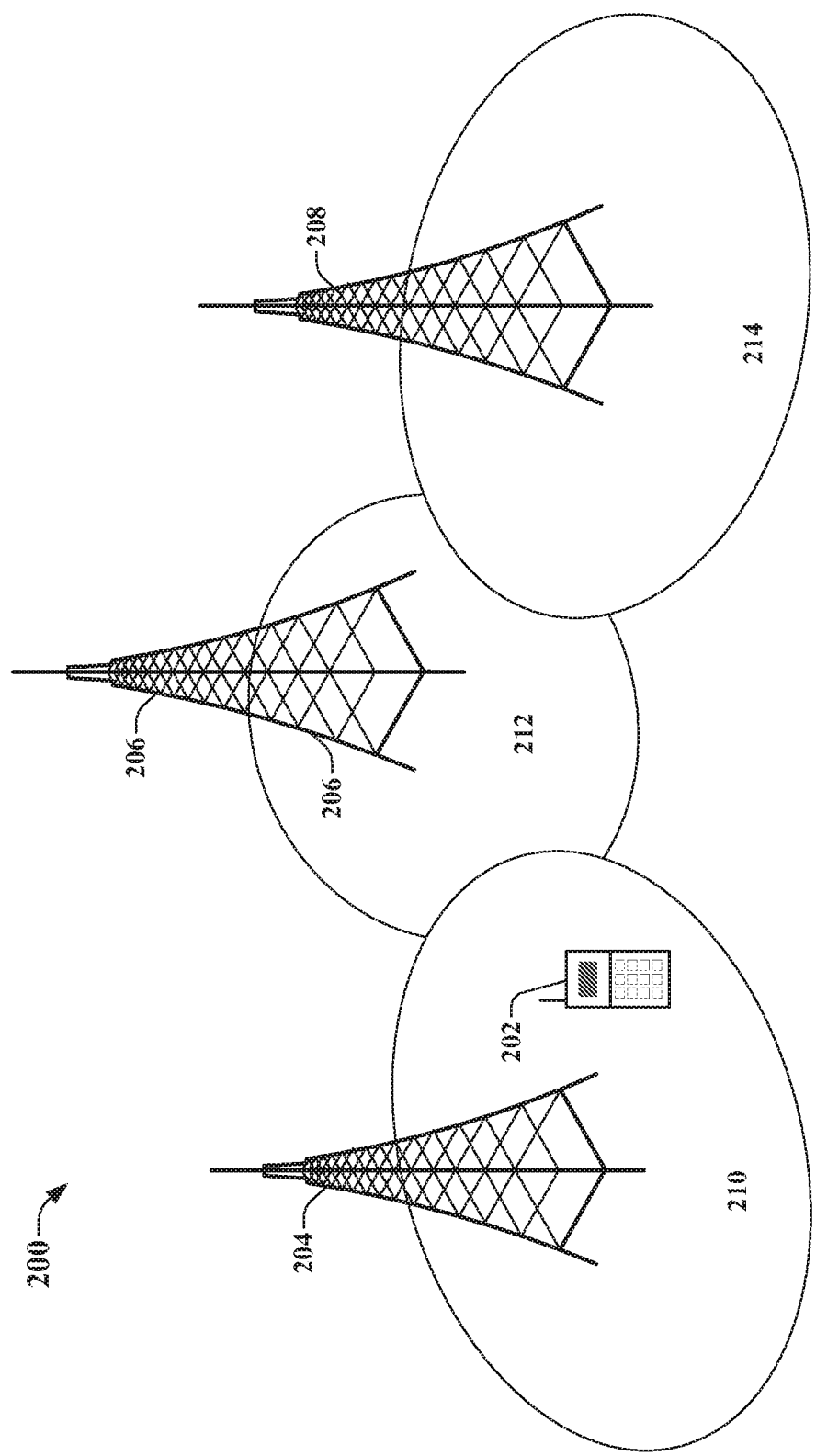
FIG. 2 illustrates an example non-limiting wireless network environment that can be utilized with the disclosed aspects.

The following example is discussed with reference also to FIG. 2, which illustrates an example non-limiting wireless network environment 200 that can be utilized with the disclosed aspects. During the operation of a wireless network, a mobile device measures and reports the pilot code power (e.g., received signal code power (RSCP)) of neighboring sectors that are using the same frequency. In a UMTS network, for example, while operating in compressed mode (CM), the mobile device also measures the received signal code power (RSCP) of UARFCN's (non used frequency (NUF)) that are different from the frequency in use. This measurement is utilized in order to trigger the need for an IFHO when nearing the edge of a UARFCN's deployment area.

Included in network environment 200 can be a plurality of mobile devices, one of which is shown as mobile device 202. Also included in wireless network environment 200 can be a plurality of sectors, illustrated as three sectors, labeled as a first sector 204, a second sector 206, and a third sector 208. Each sector has a respective geographic area or coverage area. For example, first sector 204 has a first coverage area 210, second sector 206 has a second coverage area 212, and third sector 208 has a third coverage area 214.

The mobile device 202 can travel between the coverage areas. For example, as illustrated, mobile device 202 is located in the first coverage area 210. Over time, the mobile device 202 might be moved into the second coverage area 212 and/or the third coverage area 214 (or to different sectors that are not illustrated). As the mobile device 202 is moved, such as from first coverage area 210 to second coverage area 212, a handoff (also referred to as a handover) is performed from the first sector 204 to the second sector 206. The handoff is a process of transferring an ongoing call or an ongoing data session from, in this example, the first sector 204 to the second sector 206.

The handoff can occur seamlessly when the first sector 204 and the second sector 206 are neighbors, which can be indicated in a neighbor list 108. A neighbor list is a table that associates each sector with its neighboring sectors. The neighbor list can be retained in a database 110. It is noted that a database (e.g., database 110) can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory.

According to some aspects, the neighbor list can be retained in memory 102. In accordance with another aspect, the neighbor list can be retained in a component located remote from system 100 (e.g., accessible through an air interface). For example, each sector can comprise its own neighbor list that can be different from the neighbor lists maintained by the other sectors.

As discussed, a neighbor list can comprise a list, table, or other means to associate each sector with its neighboring sectors. The neighboring sectors can be adjacent sectors (e.g., first sector 204 and second sector 206) or can be non-adjacent sectors (e.g., first sector 204 and third sector 208). According to an aspect, the neighboring sectors can utilize the same or a similar frequency (intra-frequency) or can be sectors that utilize a different frequency (inter-frequency).

Also included in system 100 is an association component 112 that can be configured to establish a neighbor relationship 114 between adjacent sectors (e.g., first sector 204 and second sector 206, second sector 206 and third sector 208, first sector 204 and third sector 208, and so forth). According to some aspects, the sectors can be existing neighbor relations or might have no existing neighbor relationships. The sectors having an existing neighbor relationship can be filtered out (e.g., no need to establish the neighbor relationship). However, initially all the neighbor interactions can be collected.

In an implementation, the neighbor relationship 114 can be established when association component 112 adds an identification of the target sector to a set of first neighbors associated with the source sector. Additionally or alternatively, the association component 112 can include an identification of the source sector to a set of second neighbors associated with the target sector. In an implementation, the neighbor list updates can provide additional target choices, which can allow mobile devices to move to a better measured target and can result in the mitigation of dropped calls during IFHO, after IFHO, and/or during CM operation prior to the IFHO.

The neighbor relationship can be established when monitor component 106 concludes that a first event ended on the first sector and, within a predefined time period, a second event started on the second sector. The predefined time period can be configurable such that the amount of time allowed between the end of a first event and a start of the second event can be shortened or lengthened. For example, the time period can be defined as a function of various parameters including, but not limited to, the location of each of the sectors, a range of the sectors, a distance between two sectors, a transmit signal strength, a receive signal strength, and so forth.

For example, when a first event ends on a source sector (or first sector) and a second event starts on a target sector (or second sector) before expiration of the pre-defined interval, it can indicate that the sectors are within a close proximity of each other. Therefore, the neighbor list of one or both of the sectors can be updated to indicate the sectors are neighbors, which can allow the mobile device to seamlessly handoff between the sectors.

In an example, the monitor component 106 can track active call data events and/or idle mode call data events. The active call data events can include RAB establishments, channel switching, internal system releases, and so forth. The idle mode call data events can include reports of different cell identifiers (IDs) that are reported within a predefined period. Other events can include the physical movement of one or more mobile devices, the report of different cell IDs within the predefined period, the actual location information of the mobile device, and so on. In an example, the physical movement of the mobile device(s) can include the observance of a first event ending on a first sector and a second event starting on a second sector before expiration of a configurable interval.

For example, the monitor component 106 can process the events and return cases when an event occurs on a first sector and the same mobile device triggers another event on a target sector within the predefined period. Thus, the physical movement of the mobile device(s) between differing sector-carriers can inform association component 112 of the potential overlap in a service coverage area of the source sector and the target sector. This can also imply that if the source sector and the target sector and not already defined as IFHO neighbor relations, then they should be defined as neighbor relations by the association component 112.

Figure 3:
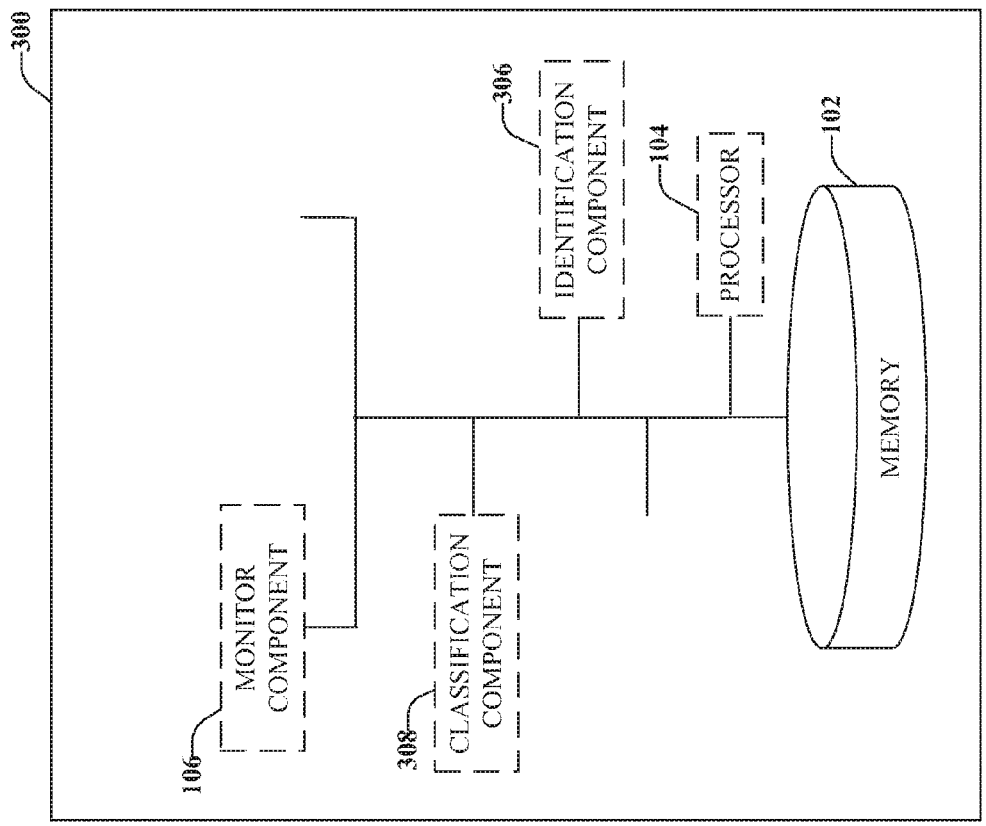
FIG. 3 illustrates another example, non-limiting system configured to identify handover relations using network events, according to an aspect.
Figure 3:
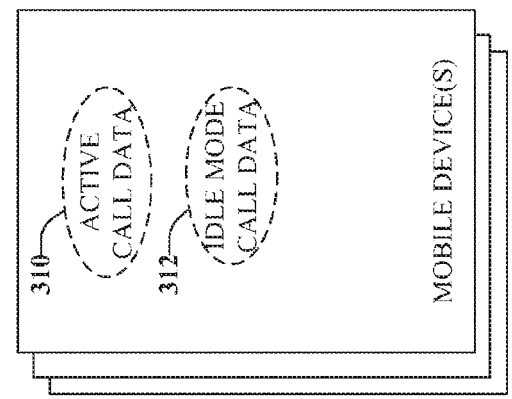

FIG. 3 illustrates another example, non-limiting system 300 configured to identify handover relations using network events, according to an aspect. Included in system 300 can be an evaluation component 302 that can be configured to monitor network events for a multitude of mobile devices 304. The evaluation component 302 can distinguish between mobile devices 304 based on identifying information that is received in reports provided by each of the mobile devices. For example, one or more mobile devices 304 can be configured to log various events in a file and report those events periodically. In an example, the network events can be events that occur in a radio network controller (RNC), wherein the RNC provides the events to the system 300.

The evaluation component 302 can also be configured to ascertain the sector on which each of the network events occurred (where each event could occur on the same sector or on different sectors). For example, a report(s) that includes the network event(s) can also include sector identification. The sector identification can be provided to an identification component 306 that can be configured to obtain information about the sector based on its sector identification. For example, the identification component 306 can obtain the information from an internal source (e.g., a database associated with system 300) or can obtain the information from a source external to system 300.

The information can include, but is not limited to, whether the sector can be established as an inter-frequency neighbor or an intra-frequency neighbor. In another example, the information can include data about the sectors that have already been identified as IFHO neighbors for the sector in question. If the sectors are already defined as IFHO neighbors, the network events reported by mobile device 304 related to the pair of sectors can be ignored by the system 300, according to an aspect.

Also included in system 300 can be a classification component 308, which can be configured to distinguish between event types, which can be network events that occur and are reported as part of a standard network operation. However, at least some of the network events can be utilized to establish neighbor relations according to the one or more aspects disclosed herein. As illustrated, the one or more mobile devices 304 can convey information to/from the system 300. Each mobile device can be in active mode or in idle mode. During active mode, the mobile device can convey active call data 310. During idle mode, the mobile device can convey idle mode call data 312. However, according to some aspects, during idle mode a mobile device might not convey information but might periodically register or might register based on crossing a registration boundary (e.g., enters active mode).

In an example, classification component 308 can distinguish a dropped call from another event. In another example, classification component 308 can distinguish between RAB establishments, channel switching, and internal system releases for both active voice and data calls (referred to herein simply as "calls" depending on the context), and/or other active call data 310. In another example, classification component 308 can distinguish active call data 310 from idle mode call data 312. An example of idle call data includes seeking information related to different cell ID's reported by one or more mobile devices that are in "idle mode" during a predetermined amount of time (e.g., 10 seconds, 30 seconds, 65 seconds, 90 seconds, and so forth).

In an implementation, the monitor component 106 can be configured to process the events. For example, processing the events in some cases can return cases where an event occurs on a sector carrier (e.g., source carrier) and then within a set period of time (e.g., 22 seconds, 43 seconds, and so on) that same mobile device triggers another event on a different sector carrier (e.g., target sector). In accordance with some aspects, the target sector can have a different UARFCN than the source sector. However, according to other aspects, the target sector and the source sector can have the same UARFCN. As used herein, a "sector carrier" is a unique combination of PSC and UARFCN.

A variety of sources for active call data can be used. Such sources can include event handling data and/or event data collected from probes tapping the Iub or Iucs. Other sources include call data records, which can capture different cell ID's (sector carrier's) at the end of a call and a start of a call on another cell ID (e.g., sector carrier) or data collected by the network itself (as is the case with GPEH). Such a situation can occur in the event of a dropped call or a failed call attempt, for example.

Idle mode call data can be obtained from data collected directly from the mobile devices. For example, an agent 314 can be embedded on the mobile devices 304 in accordance with an implementation. The agent 314 can be utilized to communicate directly with components of the systems shown and described herein. For example, agent 314 can monitor respective mobile device 304 activity and can report the activity continuously, periodically, intermittently, or as a result of a triggering event. For example, agent 314 can monitor the events and record the events (e.g., in an associated memory or database) and, at a certain interval, can report the group of events. In another example, agent 314 can monitor the events for a triggering event (e.g., a dropped call) and as a result of detection of the triggering event, the event data can be transmitted to the system 300 by the mobile device 304.

Figure 4:
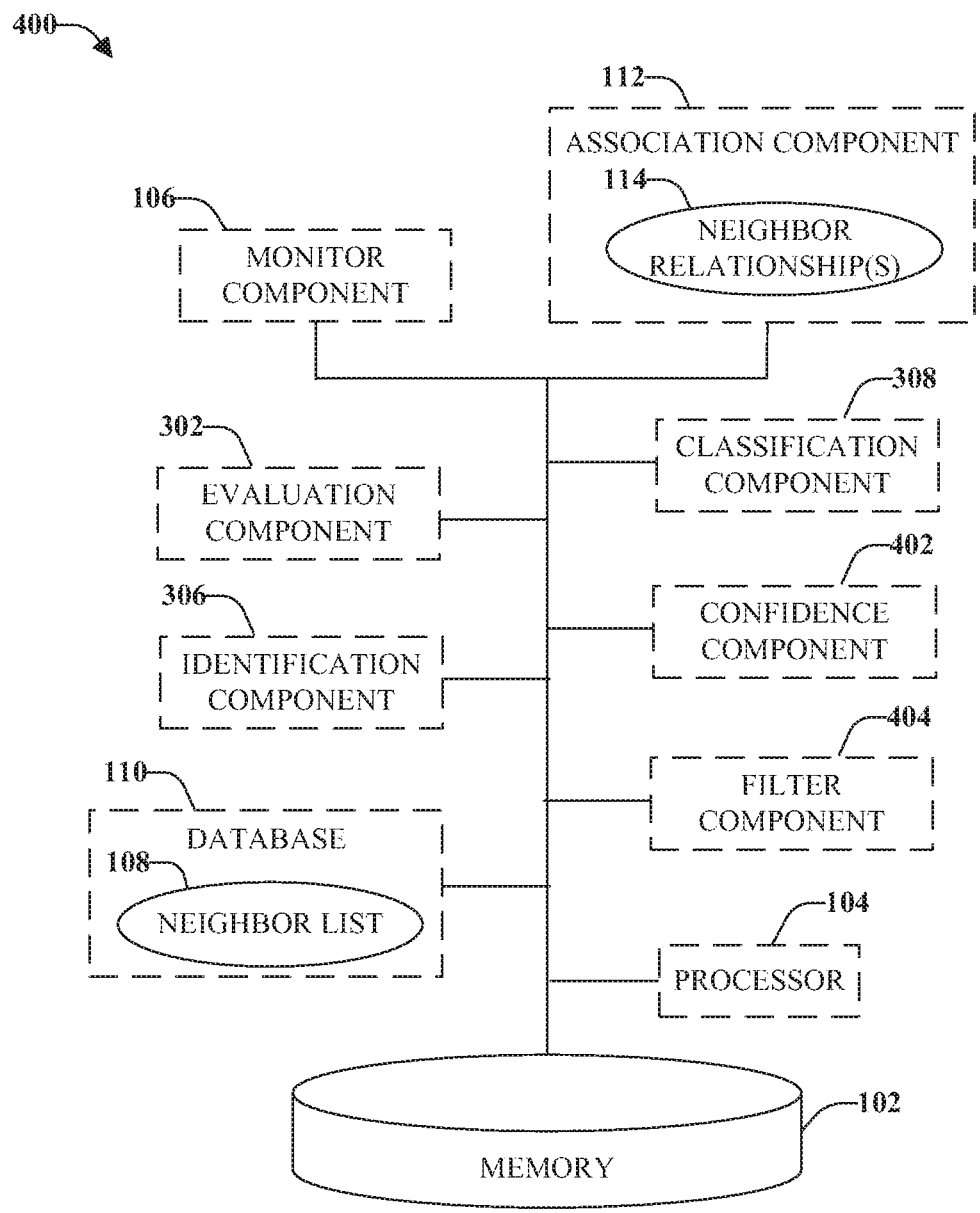
FIG. 4 illustrates an example, non-limiting system configured to automatically update one or more neighbor lists as a function of a confidence level associated with network events, according to an aspect.

FIG. 4 illustrates an example, non-limiting system 400 configured to automatically update one or more neighbor lists as a function of a confidence level associated with network events, according to an aspect. In some implementations, updates to neighbor lists can occur automatically as a function of the observations made by the monitor component 106. However, according to other implementations, the updates might not be made automatically based on a single occurrence but might be made based upon a probability that if events related to a pair of sectors happens often enough, there is a probability that the pair of sectors should be established as IFHO neighbor relations.

Included in system 400 is a confidence component 402 that can be configured to observe one or more events related to mobile devices and associate those one or more events with a pair of sectors (e.g., a source sector and a target sector). The one or more events can be observed over time (e.g., hours, days, weeks, and so forth). In an implementation, the one or more events observed are paired events for a mobile device, wherein one event ended on a first sector and a second event started on a second sector before the expiration of a configurable interval.

Based on the observations, the confidence component 402 can track the events related to the pair of sectors, even if the events are different types of events (e.g., active call events, idle mode call events, and so forth). If the tracking of events for each pair of sectors meets or exceeds a confidence threshold, it can be established that the pair of sectors are neighboring sectors and the respective neighbor lists can be updated. The confidence threshold can be configurable such that a network operator can change the confidence threshold as a function of operating procedures or other considerations. In an example, the confidence measurement can be a frequency count.

Additionally or alternatively, system 400 can include a filter component 404 that can be configured to apply logic to the analysis of the recorded events. In an implementation, the logic can be utilized to remove from the analysis an already existing source sector/target sector IFHO relation. In another implementation, the logic can be utilized to remove cases where the source sector's UARFCN is deployed on the target sector. In a further implementation, removal of both the already existing relations and the cases where both sectors use the same frequency can be applied by filter component 404.

The removal or disregard of neighbor pairs (e.g., source sector/target sector pair) as enacted by filter component 404 can result in having only the remainder of cases where a mobile device is moved from a source sector carrier to a target sector carrier where the source sector does not have the target sector defined as an IFHO relation. Additionally or alternatively, the resulting neighbor pairs are only those cases where the source sector's UARFCN is not deployed on the target sector. Either or both of these remainder potential neighbor pair relations can be candidates for IFHO neighbor additions (e.g., to a neighbor list) as discussed herein.

Figure 5:
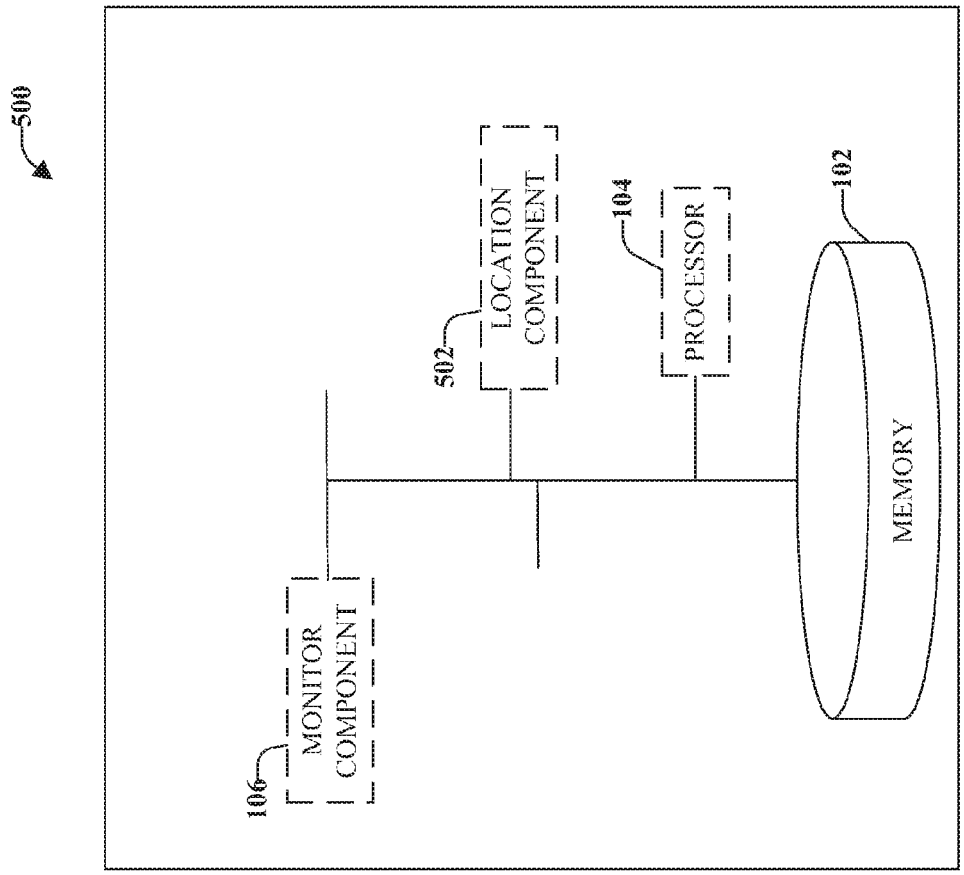
FIG. 5 illustrates an example, non-limiting system configured to utilize positioning information for automatic neighbor list modifications, according to an aspect.
Figure 5:
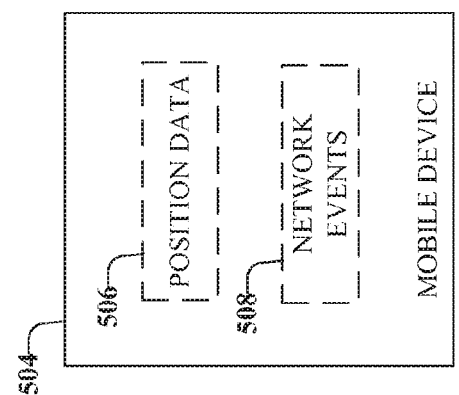

FIG. 5 illustrates an example, non-limiting system 500 configured to utilize positioning information for automatic neighbor list modifications, according to an aspect. Included in system 500 is a location component 502 that can be configured to ascertain mobile device location. In an implementation, location component 502 can interface with a mobile device 504, wherein the mobile device 504 provides position data 506 and network events 508. Although only one mobile device 504 is shown and described, it should be understood that any number of devices can interact with the disclosed systems in order for IFHO neighbor relations to be identified and configured, according to an aspect. In an implementation, the mobile device can be a GPS enabled device. However, the disclosed aspects are not limited to a GPS enabled device and a mobile device can be a non-GPS enabled device but position data can still be provided to location component 502. In another example, location component 502 can determine the location of the mobile device 504 based on various measurements and/or data.

The network events 508 can be evaluated by monitor component 106 and, when it is determined that a first network event ended on a first sector and a second network event was started on a second sector (before expiration of a timer), the first sector and the second sector can be identified as potential IFHO neighbor relations. In another example, the monitor component 106 can capture idle mode call data, which can be obtained from data collected or received from the mobile device 504.

The position data 506 captured per call or idle event can be processed by location component 502. In an implementation, location component 502 can compare the location that a mobile device established on a cell ID/frequency to that of a closest cell site (e.g., sector). For example, the position of sectors might be known a priori (e.g., when a sector is established its location can be populated in a database comprising sector information, the location of the sector can be included in sector information data). The location of the sector can be utilized at about the same time as the location of the mobile device is analyzed. Thus, for every location between two sectors, there may be particular areas that mobile devices originate to other sectors and/or re-select to other sectors. The amount of times this occurs for a given cell site pair can be utilized to determine the importance of the potential inter-frequency cell ID handoff pair. Based on the inferred importance, one or more neighbor relations can be established according to the disclosed aspects.

Figure 6:
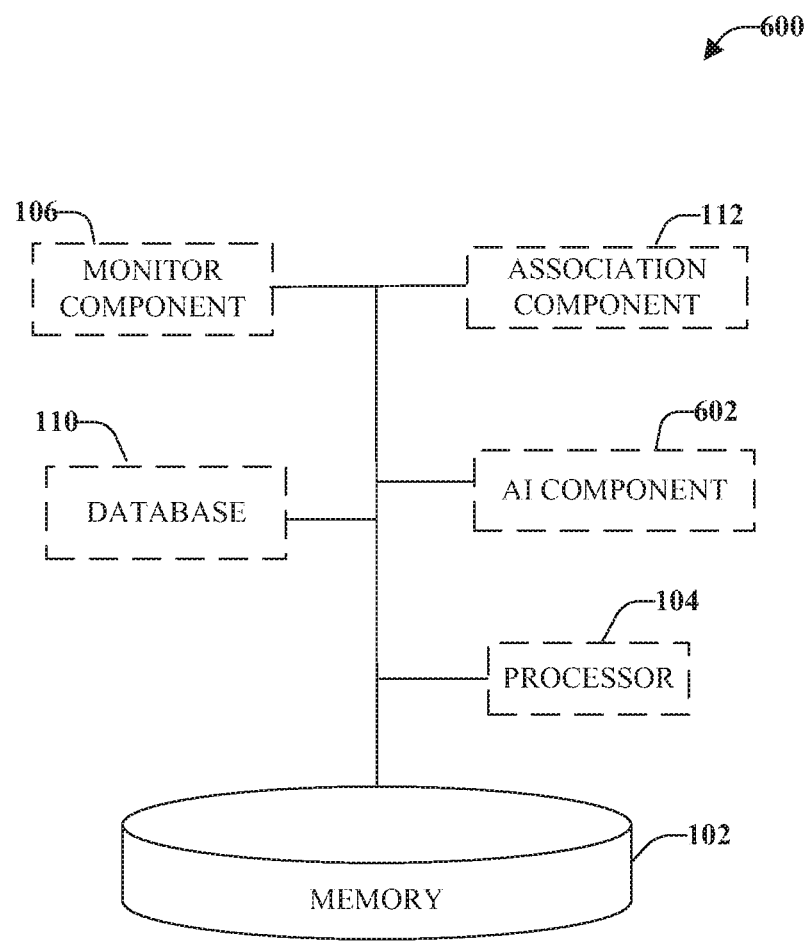
FIG. 6 illustrates an example system that employs an artificial intelligence component, which can facilitate automating one or more features in accordance with the disclosed aspects.

FIG. 6 illustrates an example system 600 that employs an artificial intelligence (AI) component 602, which can facilitate automating one or more features in accordance with the disclosed aspects. A memory 102, a processor 104, a monitor component 106, a database 110, and an association component 112, as well as other components (not illustrated) can include functionality, as more fully described herein, for example, with regard to the previous figures. The disclosed aspects in connection with establishing neighbor relations through the utilization of network events can employ various AI-based schemes for carrying out various aspects thereof. For example, a process for observing and/or recording network events, monitoring network events related to at least a pair of sectors, monitoring network events related to one or more mobile devices, concluding one or more sectors are to be identified in a neighbor list, and so forth, can be facilitated via an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of communication systems, for example, attributes can be network events associated with a pair of sectors, and the classes can be the frequency and/or type of the network events.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device behavior, observing network event occurrences, receiving extrinsic information, and so on). For example, SVMs can be configured via a learning or training phase within a classifier constructor and feature selection module. Thus, the classifier(s) can be used to automatically learn and perform a number of functions, including but not limited to determining according to a predetermined or dynamic criteria whether two or more sectors are to be classified as a handover relation (e.g., in a neighbor list), whether one or more network events are to be used to evaluate handover relations, whether one or more network events are to be ignored when handover relations are being evaluated, and so on. The criteria can include, but is not limited to, historical patterns, mobile device behavior, network event statistics, service provider preferences and/or policies, location of the mobile device, motion of the mobile device, location of one or more sectors, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by system comprising at least one processor.

Figure 7:
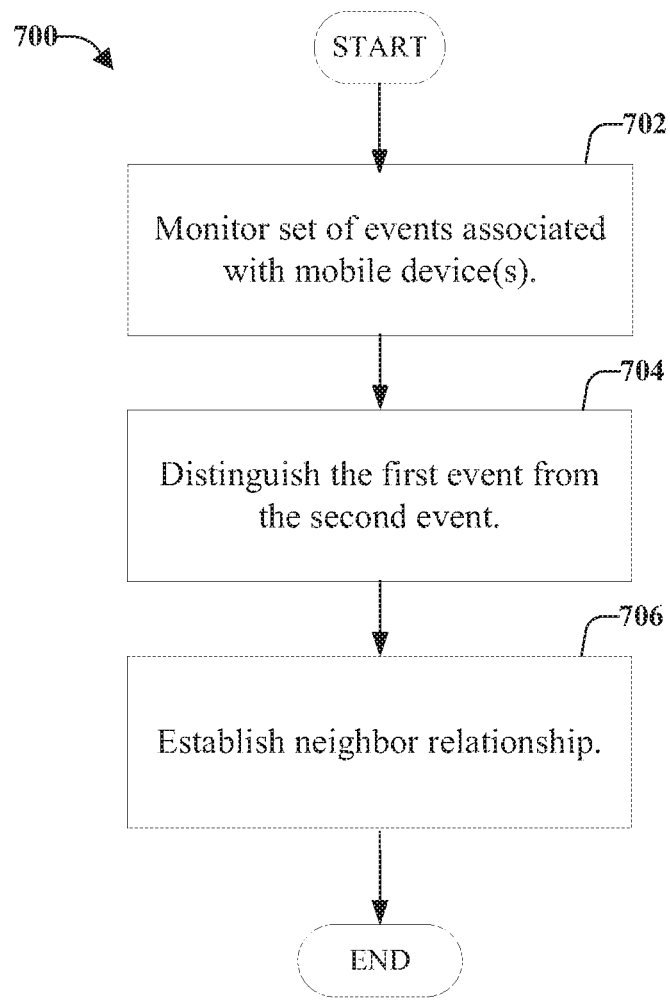
FIG. 7 illustrates a method for establishing neighbor relations between adjacent sectors, according to an aspect.

FIG. 7 illustrates a method 700 for establishing neighbor relations between adjacent sectors, according to an aspect. Method starts, at 702, when a set of events associated with one or more mobile devices are monitored. For example, a first set of events can be associated with a first mobile device and a second (or subsequent) set of events can be associated with a second (or subsequent) mobile device. The set of events can comprise a first event and a second event (or subsequent events).

At 704, the first event is distinguished from the second event. The first event can be distinguished based on a first time associated with when the first event ends on a first sector. The second event can be distinguished based on a second time associated with when the second event starts on a second sector.

A neighbor relationship can be established between the first sector and the second sector, at 706, in response to an occurrence of the second event being within a predefined period after the first event ends. For example, the predefined period can be 25 seconds. If the second event starts within 25 seconds commencing from when the first event ends, the sectors are defined as neighbors (e.g., a mobile device can move quickly between the two sectors). If the second event does not start until after the predefined period has elapsed, the sectors are not defined as neighbors (e.g., a mobile device cannot move between the sectors before expiration of the timer and, therefore, will not be handed off between the sectors).

In an implementation, the monitoring can include analyzing idle call data events received from a mobile device. In another implementation, the monitoring can include analyzing active call data events received from the mobile device. The active call data events can include radio access bearer establishments and internal system releases. In some implementations, both active call data events and idle call data events are analyzed.

Figure 8:
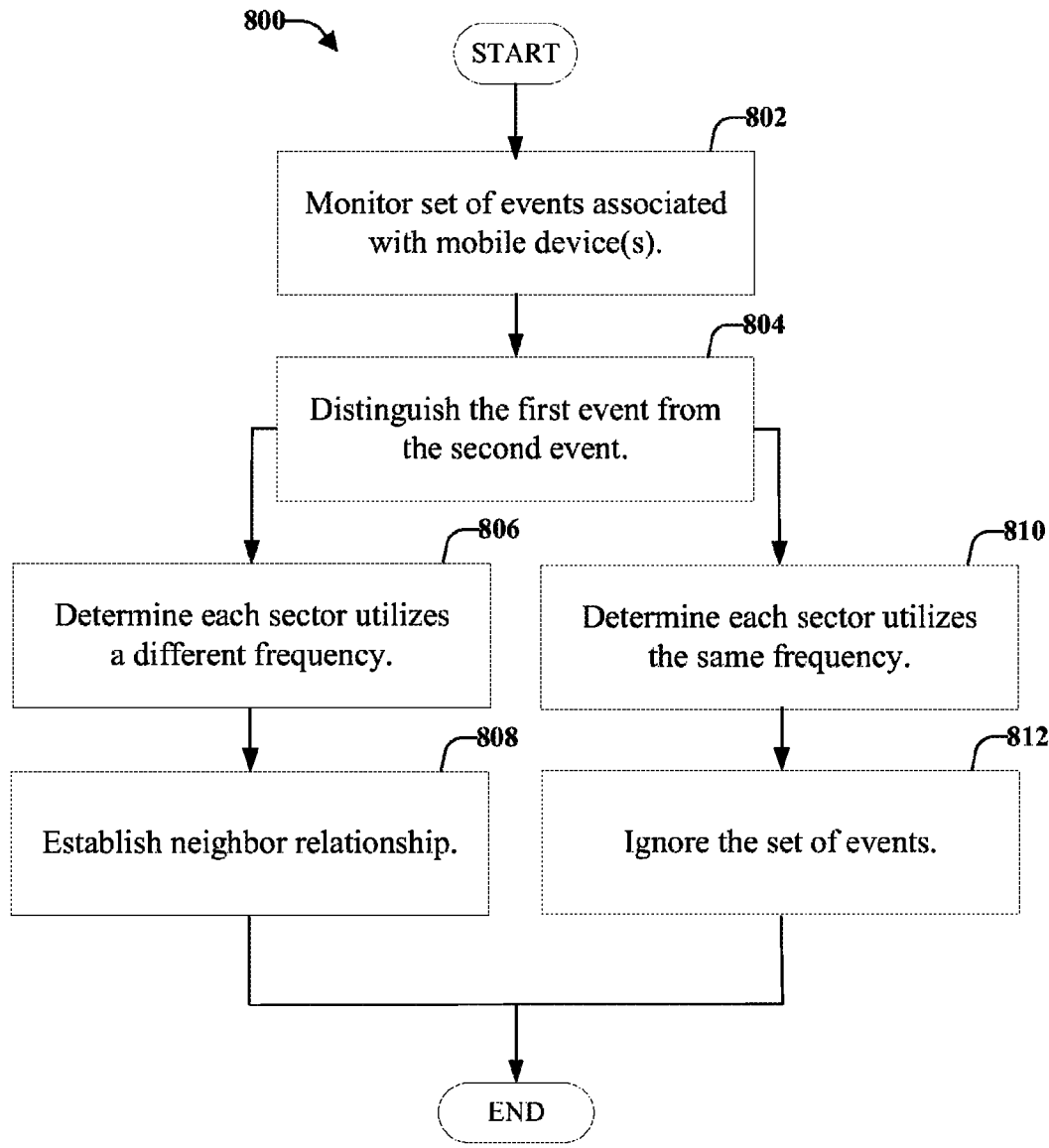
FIG. 8 illustrates another example, non-limiting method for populating neighbor lists of inter-frequency sectors, according to an aspect.

FIG. 8 illustrates another example, non-limiting method 800 for populating neighbor lists of inter-frequency sectors, according to an aspect. Method 800 starts, at 802, when a first network event and a second network event (e.g., set of network events) are received from a mobile device. At 804, the first event is distinguished by a first time that the first event ended on a first sector and the second event is distinguished by a second time that the second event started on a second sector.

At 806, it is determined that the first sector utilizes a first frequency and the second sector utilizes a second frequency (e.g., inter-frequency). Based on this determination, at 808, an inter-frequency relationship between the first sector and the second sector is established. For example, an identification of the second sector can be added to a set of first neighbors associated with the first sector. In some aspects, the set of first neighbors comprises at least one neighbor. Additionally or alternatively, an identification of the first sector can be added to a set of second neighbors associated with the second sector.

In an alternative implementation, after the first event is distinguished from the second event, at 804, method 800 continues, at 810, with a determination that the first sector and a second sector utilize the same frequency. In this case, the set of events can be ignored, at 812, and a neighbor relationship is not established. In another example, if the first sector and the second sector are not already defined in a neighbor relationship, the neighbor relationship can be established as an intra-frequency neighbor relationship.

Figure 9:
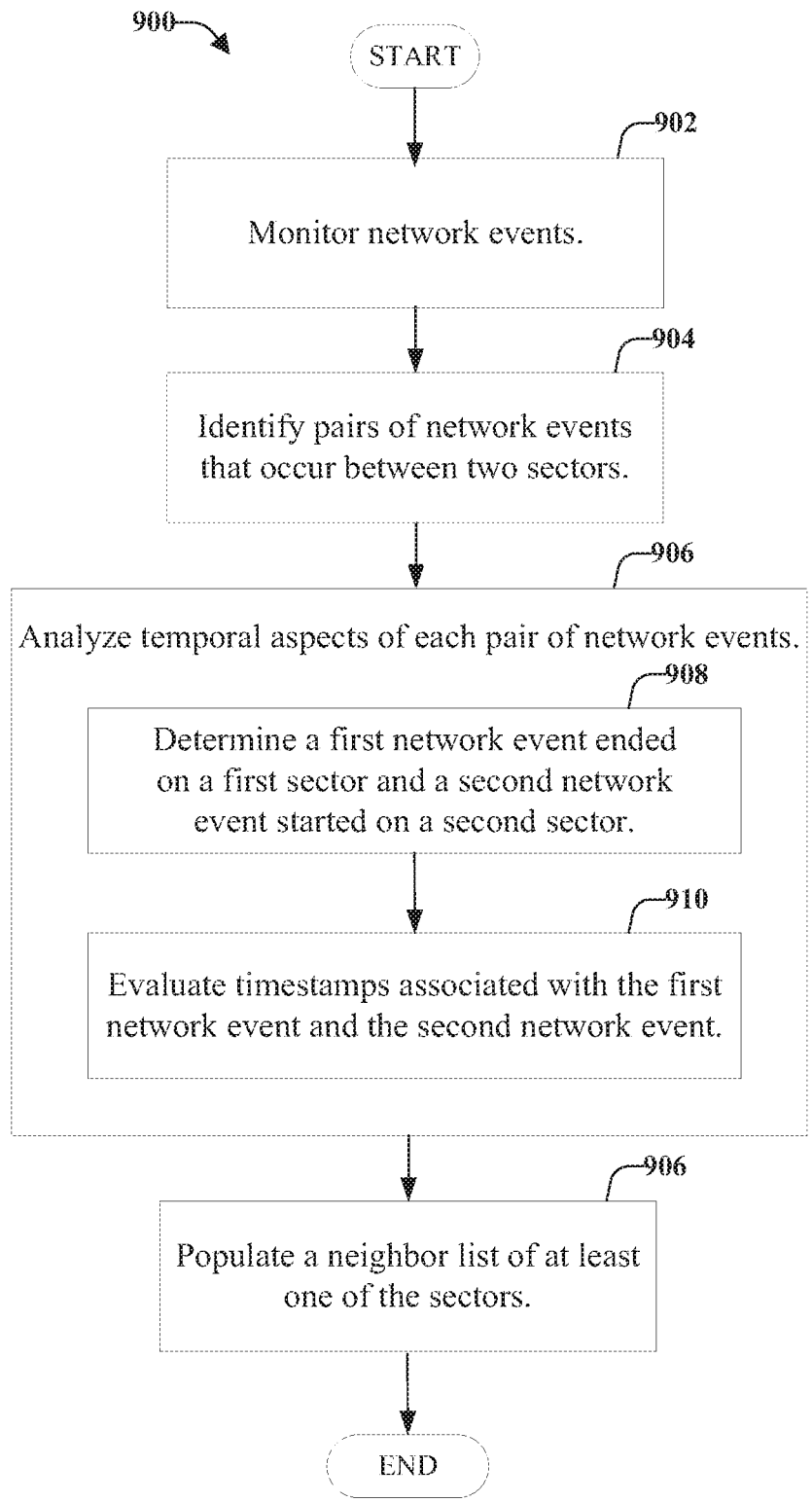
FIG. 9 illustrates another example, non-limiting method for defining neighbor relations between a pair of adjacent sectors, according to an aspect.

FIG. 9 illustrates another example, non-limiting method 900 for defining neighbor relations between a pair of adjacent sectors, according to an aspect. At 902, network events are monitored for active voice call data and idle call data. The monitored network events can be received from a plurality of mobile devices.

At 904, pairs of network events that occur between two sectors are identified. Each pair of network events can be associated with a single mobile device. Temporal aspects of each of the pairs of network events are analyzed, at 906. In an example, the analyzing can include determining, at 908, that a first network event of a pair of network events ended on a first sector and a second network event of the pair of network events started on a second sector. At 910, respective timestamps associated with the first network event and the second network event are evaluated. For example, a first timestamp can be associated with the first event and a second timestamp can be associated with the second event. In an implementation, the first timestamp is stored when the first event ends on a first sector and the second timestamp is identified in response to a start of the second event occurring on the second sector.

The method 900 can continue, at 912, when a group of neighbors of one of the two sectors is updated as a result of the analyzing (at 906). In an implementation, the group of neighbors is populated in response to determining the second network event commenced within a predefined interval after the first network event concluded. In some implementations, neighbor lists of both the first network and the second network are populated with information related to the other network.

In accordance with some aspects, method 900 includes determining a first sector and a second sector are already defined as inter-frequency handover neighbors and ignoring the pairs of network events related to the first sector and the second sector. According to other aspects, method includes determining a first sector and a second sector utilize a common frequency and ignoring the pairs of network events related to the first sector and the second sector.

Figure 10:
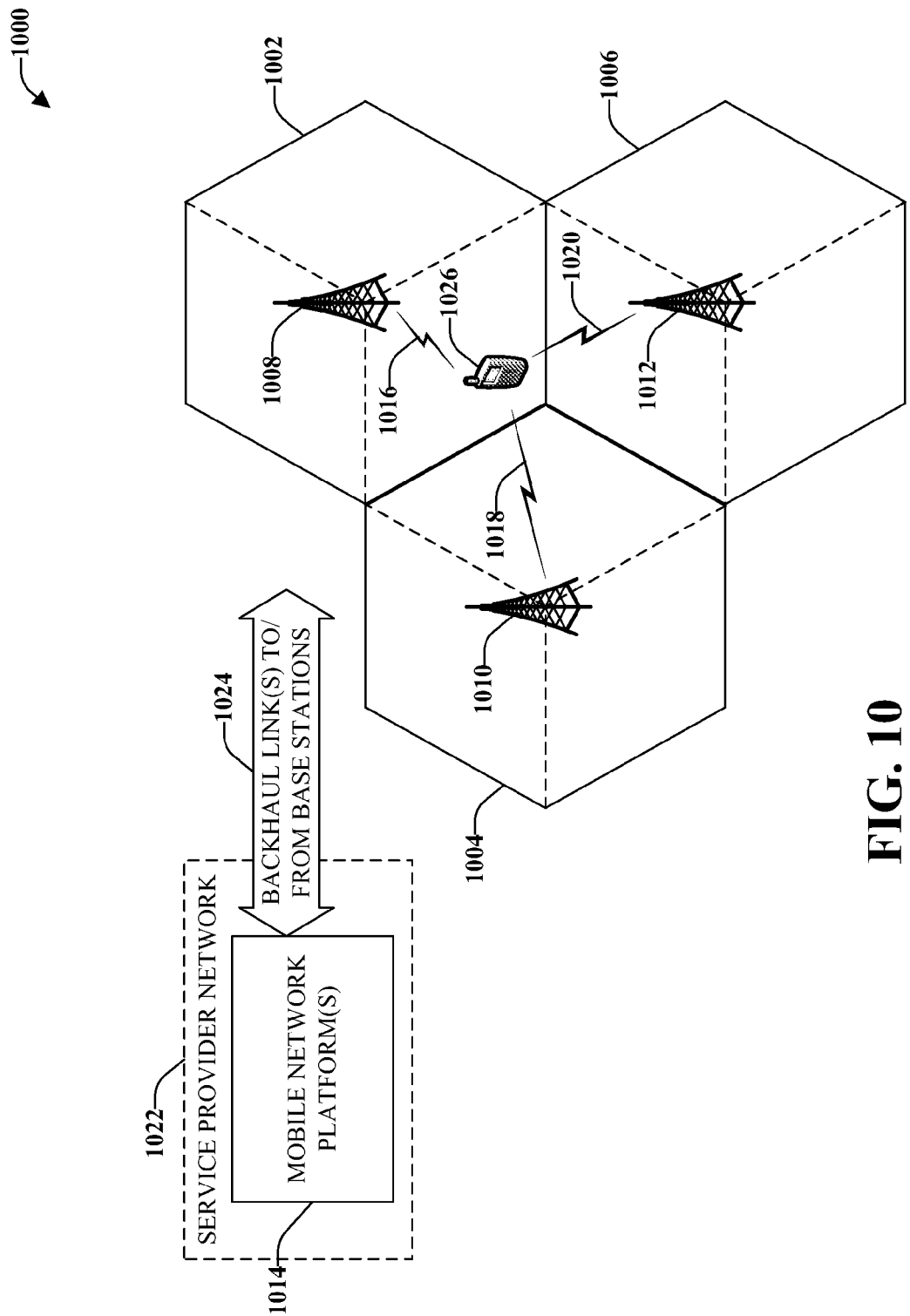
FIG. 10 is a schematic example wireless environment that can operate in accordance with aspects described herein.

By way of further description with respect to one or more non-limiting ways to establish neighbor relations between inter-frequency sectors and/or intra-frequency sectors, FIG. 10 is a schematic example wireless environment 1000 that can operate in accordance with aspects described herein. In particular, example wireless environment 1000 illustrates a set of wireless network macro cells. Three coverage macro cells 1002, 1004, and 1006 include the illustrative wireless environment; however, it is noted that wireless cellular network deployments can encompass any number of macro cells. Coverage macro cells 1002, 1004, and 1006 are illustrated as hexagons; however, coverage cells can adopt other geometries generally dictated by a deployment configuration or floor plan, geographic areas to be covered, and so on. Each macro cell 1002, 1004, and 1006 is sectorized in a 2π/3 configuration in which each macro cell includes three sectors, demarcated with dashed lines in FIG. 10. It is noted that other sectorizations are possible, and aspects or features of the disclosed subject matter can be exploited regardless of type of sectorization. Macro cells 1002, 1004, and 1006 are served respectively through base stations or eNodeBs 1008, 1010, and 1012. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1014, and set of base stations (e.g., eNode B 1008, 1010, and 1012) that serve a set of macro cells; electronic circuitry or components associated with the base stations in the set of base stations; a set of respective wireless links (e.g., links 1016, 1018, and 1020) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 1016, 1018, and 1020 embody a Uu interface (UMTS Air Interface).

Mobile network platform(s) 1014 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 1022 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1014 can control and manage base stations 1008, 1010, and 1012 and radio component(s) associated thereof, in disparate macro cells 1002, 1004, and 1006 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 1014 can be embodied in the service provider network 1022.

In addition, wireless backhaul link(s) 1024 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1024 embodies IuB interface.

It is noted that while exemplary wireless environment 1000 is illustrated for macro cells and macro base stations, aspects, features and advantages of the disclosed subject matter can be implemented in microcells, picocells, femto cells, or the like, wherein base stations are embodied in home-based equipment related to access to a network.

Figure 11:
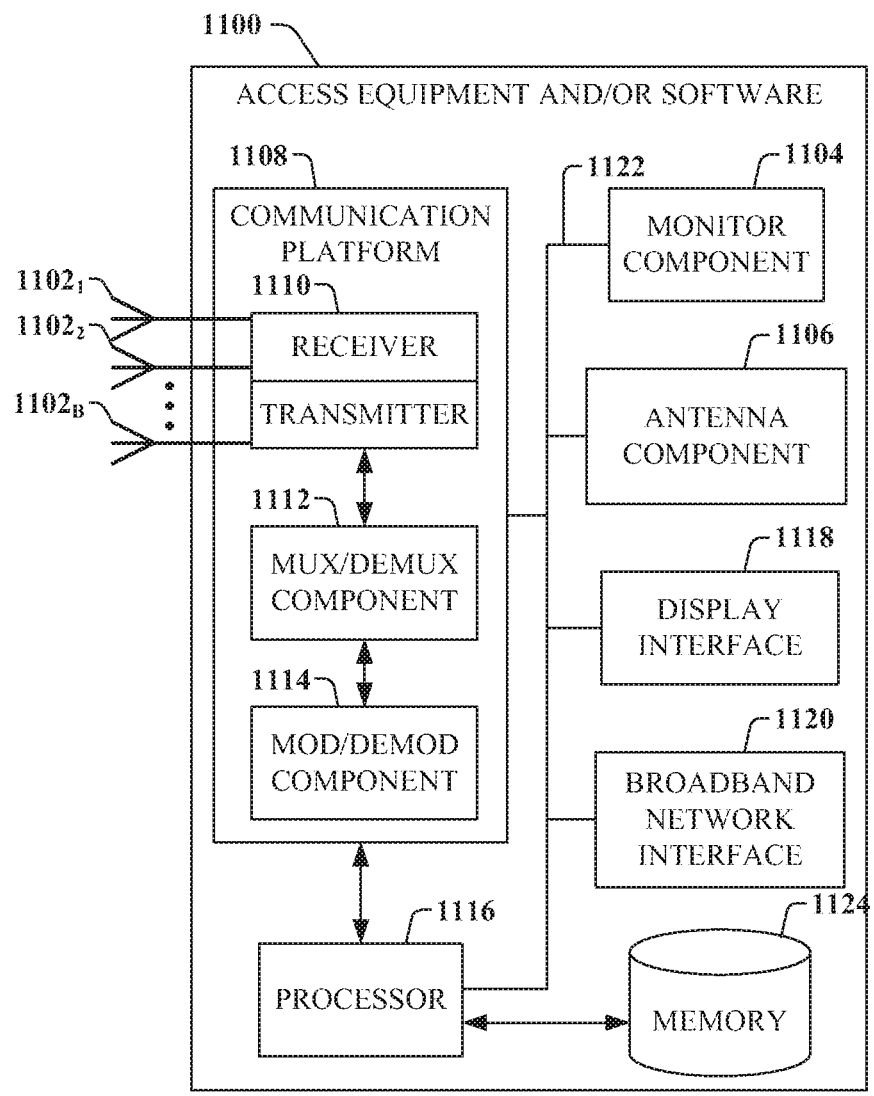
FIG. 11 illustrates a block diagram of access equipment and/or software related to access of a network, in accordance with an embodiment.

To provide further context for various aspects of the disclosed subject matter, FIG. 11 illustrates a block diagram of an embodiment of access equipment and/or software 1100 related to access of a network (e.g., base station, wireless access point, femtocell access point, and so forth) that can enable and/or exploit features or aspects of the disclosed aspects.

Access equipment and/or software 1100 related to access of a network can receive and transmit signal(s) from and to wireless devices, wireless ports, wireless routers, etc. through segments $1102_1$-$1102_B$ (B is a positive integer). Segments $1102_1$-$1102_B$ can be internal and/or external to access equipment and/or software 1100 related to access of a network, and can be controlled by a monitor component 1104 and an antenna component 1106. Monitor component 1104 and antenna component 1106 can couple to communication platform 1108, which can include electronic components and associated circuitry that provide for processing and manipulation of received signal(s) and other signal(s) to be transmitted.

In an aspect, communication platform 1108 includes a receiver/transmitter 1110 that can convert analog signals to digital signals upon reception of the analog signals, and can convert digital signals to analog signals upon transmission. In addition, receiver/transmitter 1110 can divide a single data stream into multiple, parallel data streams, or perform the reciprocal operation. Coupled to receiver/transmitter 1110 can be a multiplexer/demultiplexer 1112 that can facilitate manipulation of signals in time and frequency space. Multiplexer/demultiplexer 1112 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1112 can scramble and spread information (e.g., codes, according to substantially any code known in the art, such as Hadamard-Walsh codes, Baker codes, Kasami codes, polyphase codes, and so forth).

A modulator/demodulator 1114 is also a part of communication platform 1108, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 1100 related to access of a network also includes a processor 1116 configured to confer, at least in part, functionality to substantially any electronic component in access equipment and/or software 1100. In particular, processor 1116 can facilitate configuration of access equipment and/or software 1100 through, for example, monitor component 1104, antenna component 1106, and one or more components therein. Additionally, access equipment and/or software 1100 can include display interface 1118, which can display functions that control functionality of access equipment and/or software 1100, or reveal operation conditions thereof. In addition, display interface 1118 can include a screen to convey information to an end user. In an aspect, display interface 1118 can be an LCD (Liquid Crystal Display), a plasma panel, a monolithic thin-film based electrochromic display, and so on. Moreover, display interface 1118 can include a component (e.g., speaker) that facilitates communication of aural indicia, which can also be employed in connection with messages that convey operational instructions to an end user. Display interface 1118 can also facilitate data entry (e.g., through a linked keypad or through touch gestures), which can cause access equipment and/or software 1100 to receive external commands (e.g., restart operation).

Broadband network interface 1120 facilitates connection of access equipment and/or software 1100 to a service provider network (not shown) that can include one or more cellular technologies (e.g., 3GPP UMTS, GSM, and so on.) through backhaul link(s) (not shown), which enable incoming and outgoing data flow. Broadband network interface 1120 can be internal or external to access equipment and/or software 1100, and can utilize display interface 1118 for end-user interaction and status information delivery.

Processor 1116 can be functionally connected to communication platform 1108 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1116 can be functionally connected, through data, system, or an address bus 1122, to display interface 1118 and broadband network interface 1120, to confer, at least in part, functionality to each of such components.

In access equipment and/or software 1100, memory 1124 can retain location and/or coverage area (e.g., macro sector, identifier(s)), access list(s) that authorize access to wireless coverage through access equipment and/or software 1100, sector intelligence that can include ranking of coverage areas in the wireless environment of access equipment and/or software 1100, radio link quality and strength associated therewith, or the like. Memory 1124 also can store data structures, code instructions and program modules, system or device information, code sequences for scrambling, spreading and pilot transmission, access point configuration, and so on. Processor 1116 can be coupled (e.g., through a memory bus), to memory 1124 in order to store and retrieve information used to operate and/or confer functionality to the components, platform, and interface that reside within access equipment and/or software 1100.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1124, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 12:
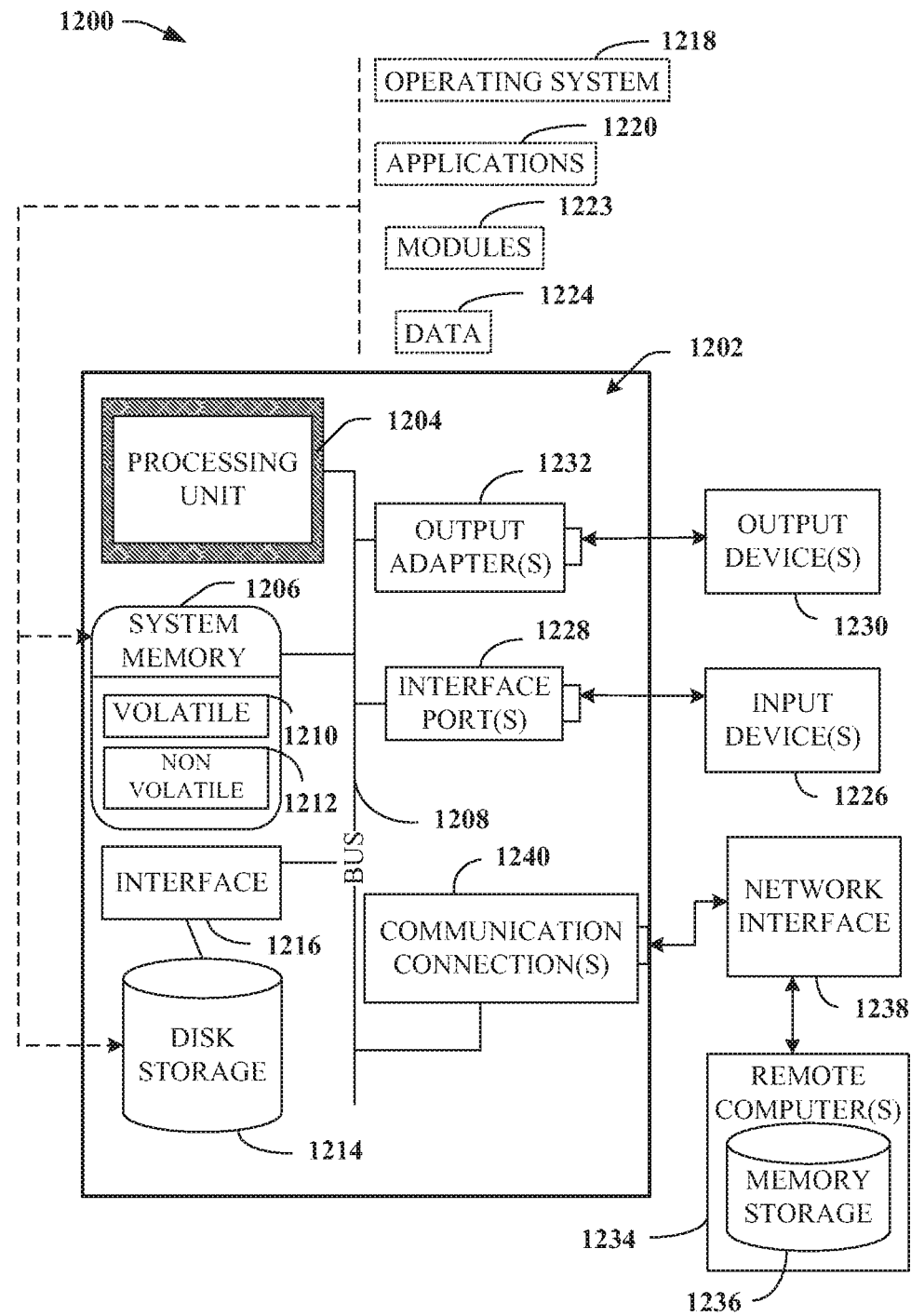
FIG. 12 illustrates a block diagram of a computing system, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 102) there can be software, which can instruct a processor (such as processor 104) to perform various actions. The processor 416 can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1202 includes a processing unit 1204, a system memory 1206, and a system bus 1208. System bus 1208 couples system components including, but not limited to, system memory 1206 to processing unit 1204. Processing unit 1204 can be any of various available processors. Dual microprocessors and other multiprocessor architectures also can be employed as processing unit 1204.

System bus 1208 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1206 includes volatile memory 1210 and nonvolatile memory 1212. A basic input/output system (BIOS), containing routines to transfer information between elements within computer 1202, such as during start-up, can be stored in nonvolatile memory 1212. By way of illustration, and not limitation, nonvolatile memory 1212 can include ROM, PROM, EPROM, EEPROM, or flash memory. Volatile memory 1210 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1202 also includes removable/non-removable, volatile/non-volatile computer storage media. In an implementation, the non-transitory computer-readable storage medium can store computer-executable instructions that, in response to execution, cause a system including a processor to perform operations. The operations can include monitoring network events for active voice call data and idle call data received from a plurality of mobile devices. The operations can also include identifying pairs of network events that occur between two sectors, analyzing temporal aspects of the pairs of network events, and updating a group of neighbors of one of the two sectors with an identification of the other one of the two sectors as a result of the analyzing.

In some aspects, the operations can include determining that a first network event of a pair of the pairs of network events ended on a first sector and a second network event started on a second sector and evaluating respective timestamps associated with the first network event and the second network event. Further to this aspect, the operations can include populating the group of neighbors with the identification of one of the two sectors in response to determining the second network event commenced within a predefined interval after the first network event concluded.

According to some aspects, the operations can include determining a first sector and a second sector are already defined as inter-frequency handover neighbors and ignoring the pairs of network events related to the first sector and the second sector. In accordance with some aspects, the operations can include determining a first sector and a second sector utilize a common frequency and ignoring the pairs of network events related to the first sector and the second sector.

FIG. 12 illustrates, for example, disk storage 1214. Disk storage 1214 includes, but is not limited to, devices such as a magnetic disk drive, floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to system bus 1208, a removable or non-removable interface is typically used, such as interface component 1216.

It is to be noted that FIG. 12 describes software that acts as an intermediary between users and computer resources described in suitable operating environment. Such software includes an operating system 1218. Operating system 1218, which can be stored on disk storage 1214, acts to control and allocate resources of computer system 1202. System applications 1220 can take advantage of the management of resources by operating system 1218 through program modules 1222 and program data 1224 stored either in system memory 1206 or on disk storage 1214. It is to be understood that the disclosed subject matter can be implemented with various operating systems or combinations of operating systems.

A user can enter commands or information, for example through interface component 1216, into computer system 1202 through input device(s) 1226. Input devices 1226 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1204 through system bus 1208 through interface port(s) 1228. Interface port(s) 1228 include, for example, a serial port, a parallel port, a game port, and a universal serial bus (USB). Output device(s) 1230 use some of the same type of ports as input device(s) 1226.

Thus, for example, a USB port can be used to provide input to computer 1202 and to output information from computer 1202 to an output device 1230. Output adapter 1232 is provided to illustrate that there are some output devices 1230, such as monitors, speakers, and printers, among other output devices 1230, which use special adapters. Output adapters 1232 include, by way of illustration and not limitation, video and sound cards that provide means of connection between output device 1230 and system bus 1208. It is also noted that other devices and/or systems of devices provide both input and output capabilities such as remote computer(s) 1234.

Computer 1202 can operate in a networked environment using logical connections to one or more remote computers, such as remote computer(s) 1234. Remote computer(s) 1234 can be a personal computer, a server, a router, a network PC, a workstation, a microprocessor based appliance, a peer device, or other common network node and the like, and typically includes many or all of the elements described relative to computer 1202.

For purposes of brevity, only one memory storage device 1236 is illustrated with remote computer(s) 1234. Remote computer(s) 1234 is logically connected to computer 1202 through a network interface 1238 and then physically connected through communication connection 1240. Network interface 1238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1240 refer(s) to hardware/software employed to connect network interface 1238 to system bus 1208. While communication connection 1240 is shown for illustrative clarity inside computer 1202, it can also be external to computer 1202. The hardware/software for connection to network interface 1238 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques.

In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
a processor; and
a memory that stores executable instructions that, when executed by the processor, facilitate performance of operations, comprising:
establishing a first network neighbor relationship between a first network device of a first network and a second network device of a second network based on a first frequency associated with a first network event and a second frequency associated with a second network event, wherein the establishing the first network neighbor relationship is based on a first coverage overlap between the first network device and the second network device;

based on the first frequency and the second frequency being determined to be a same frequency, filtering the first network neighbor relationship, wherein the filtering removes the first network neighbor relationship between the first network and the second network; and in response to the filtering and in response to a condition associated with a third network device being determined to have been satisfied, establishing a second network neighbor relationship between the first network device of the first network and the third network device of the third network, wherein the condition is related to a number of times that a mobile device has been determined to have entered a first sector associated with the third network device from a location within a second sector associated with the second network device, and wherein the establishing the second network neighbor relationship is based on a second coverage overlap between the first network device and the third network device.

2. The system of claim 1, wherein the operations further comprise:
   determining a third network event associated with the first network device;
   determining a fourth network event associated with the second network device; and
   combining the first network event and the second network event with the third network event and the fourth network event.

3. The system of claim 1, wherein the operations further comprise:
   determining a confidence level that the first network device and the second network device are adjacent network devices according to a defined adjacency criterion.

4. The system of claim 1, wherein the determining the second network event comprises analyzing idle call data events received from the mobile device.

5. The system of claim 1, wherein the establishing the first network neighbor relationship comprises establishing the first network neighbor relationship in response to the second network event being determined to begin within a defined period after the first network event has ended.

6. The system of claim 5, wherein the first network neighbor relationship comprises an intra-frequency neighbor relationship.

7. The system of claim 5, wherein an active call data event comprises radio access bearer data.

8. The system of claim 1, wherein the system is a network server.

9. A method, comprising:
   in response to a first determination of a reoccurrence of a mobile device transitioning from a first location associated with a first network device to a second location associated with a second network device, generating, by a system comprising a processor, inter-frequency data related to a first frequency associated with a first network event of the first network device and a second frequency associated with a second network event of the second network device;
   based on the inter-frequency data and a first overlap in a first coverage between the first network device and the second network device, facilitating, by the system, establishment of a first network neighbor relationship between the first network device and the second network device;
   based on a second determination that the first frequency and the second frequency are a same frequency, removing, by the system, the first network neighbor relationship between the first network device and the second network device; and
   in response to a condition associated with a third network device being determined to have been satisfied and a second overlap in a second coverage between the first network device and the third network device, establishing, by the system, a second network neighbor relationship between the first network device and the third network device, wherein the condition is related to a number of times that the mobile device has been determined to have entered a first sector associated with the third network device from a location within a second sector associated with the second network device.

10. The method of claim 9, wherein the third network device is part of a neighboring network to a network comprising the second network device.

11. The method of claim 9, wherein other network identification data of the second network device is added to a data structure of the third network device based on the inter-frequency data.

12. The method of claim 9, further comprising:
    distinguishing, by the system, the first network event from the second network event.

13. The method of claim 12, wherein the distinguishing is based on the second determination that the first frequency and the second frequency are the same frequency.

14. The method of claim 13, further comprising:
    determining that the first network and the second network are not neighboring networks based upon the first frequency and the second frequency being determined to be the same frequency.

15. A non-transitory machine-readable storage medium, comprising executable instructions that, when executed by a processor, facilitate performance of operations, comprising:
    identifying a first event with respect to first network devices of a first network and a second event with respect to second network devices of a second network as a pair of network events that occur between the first network devices and the second network devices;
    associating the first event and the second event with a mobile device, resulting in a first network neighbor association based on a first overlap in coverage between the first network devices and the second network devices;
    in response to a determination that a first frequency associated with the first event of the first network devices and a second frequency associated with the second event of the second network devices are a same frequency, removing the first network neighbor association; and
    in response to the removing the first network neighbor association and in response to a condition associated with third network devices of a third network being determined to have been satisfied, determining a second network neighbor association based on a second overlap in coverage between the first network devices and the third network devices, wherein the condition is related to a number of times that the mobile device has been determined to have entered a first sector associated with the third network devices from a location within a second sector associated with the second network devices.

16. The non-transitory machine-readable storage medium of claim 15, wherein the first event comprises active call data and wherein the second event comprises idle call data.

17. The non-transitory machine-readable storage medium of claim 15, wherein the associating is in response to the first event being terminated at a first location and the second event being initiated at a second location.

18. The non-transitory machine-readable storage medium of claim 15, wherein the operations further comprise:
based on network data associated with the second event generated by a second network device of the second network devices, updating a data structure of the second network devices with network relationship data associated with the second network neighbor association.

19. The non-transitory machine-readable storage medium of claim 18, wherein the updating is initiated in response to determining that the second event began within a defined time interval after the first event is terminated.

20. The non-transitory machine-readable storage medium of claim 18, wherein the operations further comprise:
based on frequency data associated with the same frequency and the network data, determining that the second network devices and the third network devices are neighboring network devices.

* * * * *